US011394789B2

(12) United States Patent
Gupta et al.

(10) Patent No.: US 11,394,789 B2
(45) Date of Patent: Jul. 19, 2022

(54) SEAMLESS MIGRATION OF A NETWORK MANAGEMENT SYSTEM DEPLOYMENT TO CLOUD-BASED DEPLOYMENT

(71) Applicant: HEWLETT PACKARD ENTERPRISE DEVELOPMENT LP, Houston, TX (US)

(72) Inventors: Gopal Gupta, Karnataka (IN); Sumit Kumar, Karnataka (IN); Amit Kumar Gupta, Karnataka (IN); Jacob Philip Michael, Karnataka (IN); Sriram Murthy, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 293 days.

(21) Appl. No.: 16/406,725

(22) Filed: May 8, 2019

(65) Prior Publication Data
US 2020/0358859 A1 Nov. 12, 2020

(51) Int. Cl.
*H04L 67/148* (2022.01)
*G06F 21/64* (2013.01)
*H04L 67/133* (2022.01)
*H04L 67/00* (2022.01)

(52) U.S. Cl.
CPC ............ *H04L 67/148* (2013.01); *G06F 21/64* (2013.01); *H04L 67/34* (2013.01); *H04L 67/40* (2013.01)

(58) Field of Classification Search
CPC ........ H04L 67/148; H04L 67/34; H04L 67/40
See application file for complete search history.

(56) References Cited

U.S. PATENT DOCUMENTS

| 6,199,204 | B1 | 3/2001 | Donohue |
| 6,510,466 | B1 | 1/2003 | Cox et al. |
| 7,050,946 | B2 | 5/2006 | Delegue et al. |
| 7,069,293 | B2 | 6/2006 | Cox et al. |
| 7,130,897 | B2 | 10/2006 | Dervin et al. |

(Continued)

FOREIGN PATENT DOCUMENTS

| CN | 105071959 A | 11/2015 |
| KR | 10-2014-0068261 A | 6/2014 |

OTHER PUBLICATIONS

Froehlich, A., The On-premises Vs. Cloud-managed WLAN Architecture Debate, (Web Page), Retrieved Jan. 15, 2019, 5 Pgs.

(Continued)

*Primary Examiner* — Philip J Chea
*Assistant Examiner* — Robert B McAdams
(74) *Attorney, Agent, or Firm* — Sheppard Mullin Richter & Hampton LLP

(57) ABSTRACT

A method for use in managing a networked computing system includes: receiving a trigger for a migration of a plurality of local migration artifacts from a first deployment state associated with an on-premises network management system to a second deployment state; and migrating the plurality of local migration artifacts from the first deployment state associated with the on-premises network management system to the second deployment state associated with the cloud-based provisioning system. The migration is seamless and includes reconciling at least one local migration artifact of the plurality of local migration artifacts with a plurality of remote migration artifacts maintained by the cloud-based provisioning system.

20 Claims, 4 Drawing Sheets

200 ⟶

210 — RECEIVE A TRIGGER FOR A MIGRATION OF A PLURALITY OF LOCAL NETWORK ARTIFACTS FROM A FIRST DEPLOYMENT STATE FOR AN ON-PREMISES NETWORK MANAGEMENT SYSTEM TO A SECOND, ONLINE DEPLOYMENT STATE

220 — SEAMLESSLY MIGRATE THE LOCAL NETWORK ARTIFACTS FROM THE FIRST DEPLOYMENT STATE FOR THE ON-PREMISES NETWORK MANAGEMENT SYSTEM TO THE SECOND DEPLOYMENT STATE, THE SEAMLESS MIGRATION INCLUDING RECONCILING AT LEAST ONE OF THE LOCAL NETWORK ARTIFACTS WITH A PLURALITY OF REMOTE NETWORK ARTIFACTS MAINTAINED BY A CLOUD-BASED PROVISIONING SYSTEM

(56) References Cited

U.S. PATENT DOCUMENTS

| | | |
|---|---|---|
| 7,146,412 B2 | 12/2006 | Turnbull |
| 8,341,250 B2 | 12/2012 | Pritikin et al. |
| 8,489,834 B1 | 7/2013 | Kumbhari |
| 8,640,198 B2 | 1/2014 | Raleigh |
| 8,887,144 B1 | 11/2014 | Marr et al. |
| 9,130,837 B2 | 9/2015 | Bjarnason et al. |
| 9,325,575 B2 | 4/2016 | Gray et al. |
| 9,559,903 B2* | 1/2017 | Edwards ............... H04L 67/10 |
| 9,973,467 B2 | 5/2018 | Dhulipala et al. |
| 2006/0174319 A1 | 8/2006 | Kraemer et al. |
| 2006/0280183 A1 | 12/2006 | Chen et al. |
| 2008/0049644 A1 | 2/2008 | Halbert |
| 2008/0155659 A1 | 6/2008 | Gazier et al. |
| 2009/0132682 A1 | 5/2009 | Counterman |
| 2009/0319635 A1* | 12/2009 | Christopherson ....... G06F 21/10 709/224 |
| 2010/0293269 A1 | 11/2010 | Wilson et al. |
| 2010/0306352 A1 | 12/2010 | Pritikin et al. |
| 2010/0306354 A1 | 12/2010 | Dehaan et al. |
| 2011/0145392 A1* | 6/2011 | Dawson ............. H04L 41/0813 709/224 |
| 2011/0289200 A1 | 11/2011 | Patil et al. |
| 2012/0016915 A1 | 1/2012 | Choi et al. |
| 2012/0221684 A1* | 8/2012 | Ferris ..................... H04L 67/28 709/218 |
| 2012/0254119 A1 | 10/2012 | Kumarasamy et al. |
| 2012/0266209 A1 | 10/2012 | Gooding et al. |
| 2012/0303696 A1 | 11/2012 | Kim |
| 2013/0031224 A1 | 1/2013 | Nachtrab et al. |
| 2013/0054763 A1 | 2/2013 | Van et al. |
| 2013/0061049 A1 | 3/2013 | Irvine |
| 2013/0173900 A1 | 7/2013 | Liu |
| 2013/0211546 A1 | 8/2013 | Lawson et al. |
| 2013/0232497 A1 | 9/2013 | Jalagam et al. |
| 2013/0262390 A1 | 10/2013 | Kumarasamy et al. |
| 2013/0346260 A1* | 12/2013 | Jubran ................. G06F 9/5072 705/28 |
| 2014/0032920 A1 | 1/2014 | Gehrmann et al. |
| 2014/0047342 A1 | 2/2014 | Breternitz et al. |
| 2014/0049365 A1 | 2/2014 | Ahearn et al. |
| 2014/0280940 A1 | 9/2014 | Chapman et al. |
| 2014/0379536 A1 | 12/2014 | Varma et al. |
| 2015/0009861 A1 | 1/2015 | Balazs et al. |
| 2015/0356094 A1* | 12/2015 | Gorelik ............... G06F 16/2457 707/748 |
| 2015/0373001 A1 | 12/2015 | Schatzmann et al. |
| 2016/0080502 A1 | 3/2016 | Yadav et al. |
| 2016/0337190 A1 | 11/2016 | Wachter et al. |
| 2017/0024261 A1* | 1/2017 | Atluri ................... G06F 9/5088 |
| 2018/0063000 A1* | 3/2018 | Wu ..................... G06F 9/45558 |
| 2018/0083830 A1 | 3/2018 | Pendleton et al. |
| 2018/0213036 A1* | 7/2018 | Vasetsky ............. H04L 41/0896 |
| 2020/0267216 A1* | 8/2020 | Haggart .............. H04L 67/1097 |
| 2020/0296586 A1 | 9/2020 | Murthy et al. |

OTHER PUBLICATIONS

Winstanley, P., Implementing Windows Autopilot—The Future of Device Deployment, (Web Page), Retrieved Oct. 19, 2018, 18 Pgs.

Michael Armbrust et al., "A View of Cloud Computing," Communications of the ACM, Apr. 2010, pp. 50-58, vol. 53, No. 4, ACM.

Dikaiakos et al., "Cloud Computing: Distributed Internet Computing for IT and Scientific Research", IEEE, Internet Computing, Sep./Oct. 2009, pp. 10-13.

Daniel Nurmi et al., "The Eucalyptus Open-source Cloud-computing System," 9th IEEE/ACM International Symposium on Cluster Computing and the Grid, 2009, pp. 124-131, IEEE.

"Elasticsearch-dump", taskrabbit, available online at <https://web.archive.org/web/20170227213250/https://github.com/taskrabbit/elasticsearch-dump>, Feb. 27, 2017, 7 pages.

"Cassandradump", available online at <https://web.archive.org/web/20150703063319/https://github.com/gianlucaborello/cassandradump>, Jul. 3, 2015, 3 pages.

* cited by examiner

SEAMLESS MIGRATION OF A NETWORK MANAGEMENT SYSTEM DEPLOYMENT TO CLOUD-BASED DEPLOYMENT

BACKGROUND

Network management systems gather and store large amounts of information associated with the operation of associated computing systems. For instance, operational data may be logged and eventually archived as may data regarding configurations and settings for network devices. The network management systems also typically include inventories of network devices in the computing system, data associated with the configuration of the network devices, and device certificates for the network devices.

BRIEF DESCRIPTION OF THE DRAWINGS

The invention may be understood by reference to the following description taken in conjunction with the accompanying drawings, in which like reference numerals identify like elements, and in which.

Figure 1:
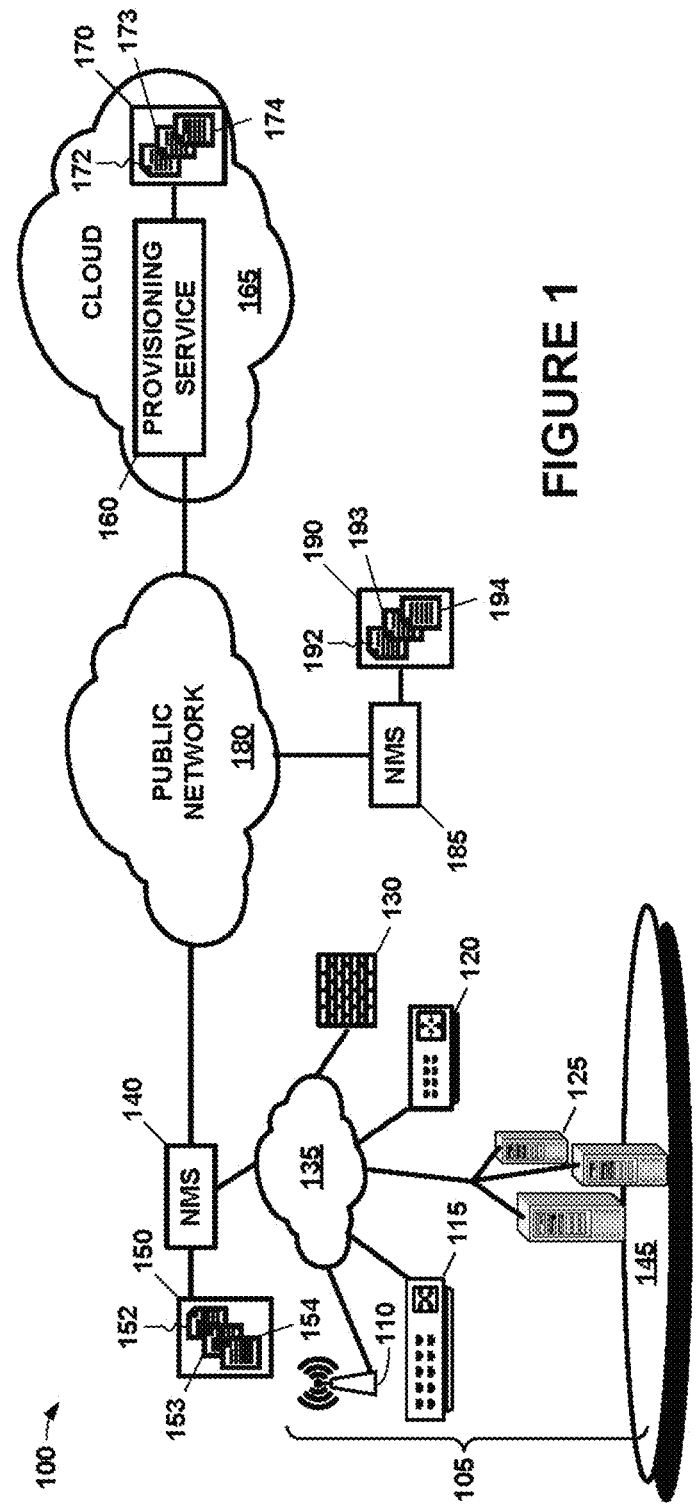
FIG. 1 depicts selected portions of a network management system deployed and migrated in accordance with one or more examples of the subject matter claimed below.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present disclosure provides a technique that seamlessly migrates migration artifacts from a first deployment state for an on-premises network management system ("NMS") to a second, deployment state. In the present context, "seamless" means without the need for user interaction or input once the migration is triggered. The on-premises network management system may be "offline" or "online". "Offline" in this context means the network management system is self-contained within the premises without access to a public network. "Online" in this context means the network management system has access to a public network. The public network may be, for example, the Internet and, more particularly, the World Wide Web of the Internet.

The online deployment state may be on-premises or off-premises (for example, in a cloud-based deployment). "On-premises" in this context means that the network management system resides in the same facility—or "premises"—as the network devices that it is managing. That is, "on-premises" describes the condition of being co-located with where the core networking infrastructure is deployed. "Off-premises" in this context means that the network management system resides in a facility—or premises—other than the one in the network devices that it is managing reside. Thus, "off-premises" describes the condition of not being co-located with where the core networking infrastructure is deployed. One example of "off-premises" alluded to above is a cloud hosted on a computing system that is housed in a different facility (e.g., a data center) from the facility in which the managed network's network devices reside.

In some examples, the first deployment state may be offline and on-premises and the second deployment state may be online and on-premises. In other examples, the first deployment state may be on-premises and offline while the second deployment state may be online and off-premises. In still other examples, the first deployment state may be, online and on-premises and the second deployment state may be online and off-premises.

The seamless migration includes a reconciliation of "migration artifacts". Migration artifacts in the present context include all the entities that are present and maintained by the network management system in a database kept for that purpose and that can be migrated to a different deployment. Migration artifacts may include, for instance, a device inventory of the network devices that the network management system is managing, certificates that the network management system will be providing to the network devices, monitoring statistics about the network devices that network management system is managing, alerts and syslog messages that have been issued by the network management system, and any other data that network management system has about the devices it is managing. The device inventory is a list of the network devices in the computing system that the on-premises network management system manages. The device inventory is maintained by the on-premises network management system as a part of, its management responsibilities.

The reconciliation is between the migration artifacts of the on-premises network management, system and their counterparts maintained on a cloud-based provisioning service used in the management of the network. This reconciliation ordinarily is performed by the client who owns the on-premises network management system and involves extensive, tedious, comparison of records and acquisition of information. Making the reconciliation a part of the seamless migration not only eases the burden of the reconciliation from the client, it also promotes accuracy and minimizes loss of migration artifacts during the migration. The types of reconciliation to be performed depend on whether the on-premises network management system is offline and online and whether the cloud-based network management system is online or cloud-deployed.

More particularly, in some examples, a method for use in managing a networked computing system, includes: receiving a trigger for a migration of a plurality of local migration artifacts from a first deployment state, associated with an on-premises network management system to a second deployment state; and migrating the plurality of local migration artifacts from the first deployment state associated with the on-premises network management system to the second deployment state associated with the cloud-based provisioning system. The migration is seamless and includes reconciling at least one local migration artifact of the plurality of local migration artifacts with a plurality of remote migration artifacts maintained by the cloud-based provisioning system. The local migration artifact may include at least one of a device inventory of a plurality of network devices managed by the on-premises network management system, certificates that the on-premises network management system will be providing to the network devices, monitoring statistics about the network devices managed by the network management system, alerts that have been issued by the network management system, and syslog messages that have been issued by the network management system.

In another example a networked computing system includes: a plurality of network devices; a plurality of local migration artifacts; an on-premises network management system that, in operation, manages the plurality of network devices and includes and maintains the plurality of local migration artifacts; and a software component that, upon receiving a trigger, seamlessly migrates the plurality of local migration artifacts from a first deployment state associated with the on-premises network management system to a second deployment state. The seamless migration includes reconciling at least one local migration artifact of the plurality of local migration artifacts with a remote migration artifact of a plurality of remote migration artifacts maintained by a cloud-based provisioning system. The at least one local migration artifact may include at least one of a device inventory of the network devices managed by the on-premises network management system, certificates that the on-premises network management system will be providing to the network devices, monitoring statistics about the network devices managed by the network management system, alerts that have been issued by the network management system, and syslog messages that have been issued by the network management system.

In still another example, a computing apparatus includes: a processing resource; a bus system; and a memory that, in operation, communicates with the processing resource over the bus system and is encoded with instructions that, when executed by the processing resource over the bus system, cause the processing resource to: receive a trigger for a migration of a plurality of local migration artifacts from a first deployment state for an on-premises network management system to a second deployment state; and seamlessly migrate the local migration artifacts from the first deployment state associated with the on-premises network management system to the second deployment state. The seamless migration includes reconciling at least one local migration artifact of the plurality of local migration artifacts with a plurality of remote migration artifacts maintained by a cloud-based provisioning system. The at least one local migration artifact may include at least one of a device inventory of the network devices managed by the on-premises network management system, certificates that the on-premises network management system will be providing to the network devices, monitoring statistics about the network devices managed by the network management system, alerts that have been issued by the network management system, and syslog messages that have been issued by the network management system.

Turning now to FIG. 1, a networked computing system 100 in accordance with one or more examples of the subject matter claimed below is shown. The networked computing system 100 includes a number of network devices 105. In this context, "network devices" include network devices that belong to the network infrastructure itself (e.g., capable of transmitting control plane frames), such as, switches, routers, access points, controllers, etc.) as opposed to devices that are managed by the network infrastructure. The network devices 105 may therefore include, for instance, one or more access points 110, switches 115, routers 120, servers 125 (only one indicated): and firewalls 130 communicating over a network 135, This list is neither exhaustive or limiting and other types of network devices 105 may be found in other examples.

The networked computing system 100 also includes a network management system ("network management system") 140 that, among other things, manages the operation and functionality of the network devices 105. In some examples, the network management system 140 may be hosted on the premises 145, and so may be referred to as an "on-premises network management system". The network management system 140 is a suite of software applications that are used to monitor, maintain, and control the software and hardware resources of the networked computing system 100. The network management system 140 may monitor and manage the security, performance, and/or reliability of the network devices 105. Performance and reliability of the network devices 105 may include, for instance, discovery, monitoring and management of the network devices 105 as well as analysis of network performance associated with the network devices 105 and providing alerts and notifications. The network management system 140 therefore may include one or more applications to implement these and other functionalities.

The network management system 140 creates and maintains a plurality of local migration artifacts 150. The local migration artifacts 150 may include, for instance, a local device inventory 152 of the network devices 105, local network data 153, and a plurality of local device certificates 154. This listing of local migration artifacts 150 is representative only and is neither exhaustive nor limiting. The local network data 153 may include, for instance, monitoring statistics about the network devices managed by the network management system, alerts that have been issued by the network management system, and syslog messages that have been issued by the network management system. Those in the art having the benefit of this disclosure will appreciate that the local migration artifacts 150 reside in one or more repositories—typically databases—on storage that is a part of the network 135. The local migration artifacts 150 are created and maintained by the on-premises network management system 140 and therefor may be considered "local migration artifacts" because they are local relative to the network management system 140.

The network management system 140 creates and maintains the local migration artifacts 150 during the operation of the networked computing system 100. The local migration artifacts 150 result, in part, from a process related to managing the networked computing system 100 called "provisioning". The manner in which provisioning occurs depends on the connection status of the on-premises network management system 140. The on-premises network management system 140 may be "offline" or "online". "Offline" and "online" are defined relative to connection to a public network such as the public network 180 as described above. This connection status will also, affect how the reconciliation performed as a part of the seamless migration occurs.

For purposes of the present disclosure, "offline" means that the network devices 105 and/or the on-premises network management system 140 do not have access to a public network, such as the public network 180. Because the network devices 105 and the on-premises network management system 140 do not have access to the Internet, they cannot use cloud-based provisioning services, such as the cloud-based provisioning service 160. (The role of the cloud-based provisioning service 160 in provisioning is discussed below relative to the "online" connection status of the on-premises network management system 140.)

Accordingly, when a new network device 105 is acquired, the on-premises network management system 140 updates the local migration artifacts 150. More particularly, when the new network device 105 is first connected to the computing system 100, the on-premises network management system 140 adds the new network device 105 into the local inventory 152, enters the configuration and other information to the local network data 153, and the device certificate 154 for the new network device 105 is acquired, retrieved and stored. The remote migration artifacts 170 may be separately maintained for the networked computer system 100 using a cloud-based provisioning service 160.

To alleviate the difficulties of managing the networked computing system 100 when the on-premises network management system 140 is "offline", the on-premises network management system 140 may be placed "online". In this context, "online" means the network management system 140 has access to the public network 180 and cloud-based provisioning services 160. Through communication with such cloud-based services 160, the network management system 140 retrieves a validated list of network devices shipped to the proprietor.

For instance, when a new network device 105 is added to the networked computing system 100, the new network device 105 is added to the local device inventory 152, its configuration and other information is added to the local network data 153, and the device certificate 154 is retrieved and stored. Once added, data regarding the new network device 105 and its operation may also be stored by the network management system 140 in the local network data 153. When the new network device 105 is removed from the networked computing system 100, the network management system 140 deletes it from the device inventory 152 as well as its associated data from the local network data 153 and its device certificate 154.

The network management system 140 in some examples may use one or more cloud-based provisioning services 160 hosted on a cloud 165 to assist in provisioning the networked computing system 100. The cloud 165 may be public or private but will generally be a private cloud. The cloud 165 will typically reside in a facility different from that in which the networked computing system 100 resides. The network management system 140 communicates with the cloud-based provisioning service 160 over a public network 180. However, the subject matter below is not so limited. For instance, in some examples, the cloud 165 and the networked computing system 100 are separate systems but are nevertheless housed in the same facility, such as a data center.

In one example, a network management system can manage wired and wireless infrastructure and a wide range of third-party manufacturers, and provides granular visibility into devices, users and applications on the network. Through a centralized and intuitive user interface, the network management system can provide real-time monitoring, proactive alerts, historical reporting, and fast, efficient troubleshooting. Dedicated dashboard views quickly help view potential RF coverage issues, unified communications and collaboration ("UCC") traffic, application performance and network services health.

The network management system may be available as software or a combined hardware and software appliance. The network management system 140 may permit administrators and development and operations ("DevOps") professionals to access infrastructure and manage multiple generations of wired and wireless networks from just about many different vendors from controllerless to controller-managed and from legacy wireless local area network ("WLAN") to the latest generations of WLANs. As a part of this use, the network management system may maintain migration artifacts such as inventories, network data, and device certificates for the network devices of a proprietor.

The network management system 140 will track network devices 105 through the local migration artifacts 150 in its day-to-day operations. In general, the proprietor of the networked computing system 100 will acquire new network devices 105 from a vendor. The cloud-based provisioning service 160 tracks the network devices 105 of the networked computing system 100 as they are procured. The network management service 140 may be provided the associated information for those network devices 105 using the cloud-based provisioning service 160.

To this end, the cloud-based provisioning service 160 maintains a plurality of remote migration artifacts 170 pertaining to the networked computing system 100. This may result from the role of the cloud-based provisioning service 160 in provisioning the networked computing system 100 or from separate record keeping as new network devices 105 are provided to the networked computing system 100. The remote migration artifacts 170 include, for instance, a remote device inventory 172 of the network devices 105, remote network data 173, and a plurality of remote device certificates 174. The remote migration artifacts 170 do not reside on the networked computing system 100 and so may be considered "remote migration artifacts" for purposes of this disclosure.

The newly ordered network device 105 is automatically added to the remote device inventory 172 maintained by the cloud-based provisioning service 160. The entry for the newly ordered network device 105 is associated with proper provisioning rules for the particular networked computing system 100. Such association may be accomplished by placing device information for that particular network device into a folder associated with a desired set of rules to be followed.

The newly acquired, non-provisioned network device 105 is then factory-shipped to a targeted destination—the premises 145 in this example. A non-technical, person takes the network device out of the box and an event occurs (e.g., power-up and connection to a network; connection to a network; time-based in which a prescribed amount of time has elapsed; or return back to the first operating state). In its "non-provisioned state," the network device 105 has no configuration settings and has no knowledge of a network device that is operating as its configuration device (e.g., network management server or a controller).

Upon connection, the network device 105 in the non-provisioned state retrieves its provisioning information from the cloud-based provisioning service 160. (Remember, the network device 105 has already been added to the remote device inventory 172 and its associated information added to the remote network data 173.) The network device 105 uses the provisioning information to obtain its configuration information from another network device 105 (not otherwise shown) operating as a configuration device. Depending on the mode of operation, such as where the network device 105 is operating as a virtual control device, the network device 105 may then push that configuration out to one or more other subordinate network devices 105 in the networked computing system 100.

In contrast, in another operating (provisioned) state, the network device 105 is provided with rules that define how the device may contact its configuration device to retrieve information, such as firmware and configuration settings and in what configuration group the network device belongs. The rules may be provided by the cloud-based provisioning service 160 from, for example, the remote network data 173 artifact of the remote migration artifacts 170. Or, the rules may be otherwise acquired. Furthermore, the rules may be used to automatically assign the network device 105 to specific geographical locations.

As a part of the provisioning for the network device 105, the network management system 140 will download a device certificate 154 to the repository of the local migration artifacts 150. The device certificate 154 may be obtained from the vendor from which the network device 105 was acquired. In this instance, the device certificate may be obtained through the cloud-based provisioning service 160—e.g., by downloading the associated remote device certificate 174. However, local device certificates 154 for network devices 105 can be obtained from a variety of sources. For instance, they may be obtained from third-parties or the client may provide one themselves.

The cloud-based provisioning service 160 automates the provisioning process, allowing a single administrator to deploy devices throughout a networked computing system. When the proprietor orders a new device from a vendor, that device is automatically added to the proprietor's remote device inventory 172 in the cloud-based provisioning serve. Once a device is in the device inventory, it can be automatically or manually associated to a folder and provisioning rule. An administrator connects the network device 105 to a public network 180 like the Internet, and that network device 105 will securely connect to the cloud-based provisioning service 160, retrieve its provisioning information, then use the provisioning information to connect to its configuration device (not shown) and update its configuration. This process requires no human intervention, allowing for secure "zero-touch provisioning".

Accordingly, regardless of whether the network management system 140 is online or offline, the network management system 140 maintains the local migration artifacts 150 and the cloud-based provisioning service 160 maintains the remote migration artifacts 170. However, one skilled in the art having the benefit of this disclosure will appreciate that there are a number of opportunities for the content of the local migration artifacts 150 to diverge from the content of the remote migration artifacts 170. For instance, network devices 105 may be acquired from more than one vendor. The remote device inventory 172 maintained by each of the vendors for the networked computing system 100 will then differ from the local device inventory 152 kept by the network management system 140 of the networked computing system 100. Similarly, if the proprietor of the networked computer system 100 provides its own device certificate 154, or if the proprietor of the networked computing system 100 obtains a device certificate 154 from a third-party, then the local device certificate 154 will differ from the remote device certificate 174 maintained by the cloud-based provisioning system 160 in the remote migration artifacts 170.

The present disclosure provides a technique by which the local migration artifacts 150 may be seamlessly migrated from one "deployment state" to a "second deployment state". The first deployment state is pre-migration and the second deployment state is post-migration in the illustrated examples. The deployment state is a function of connection status (i.e., whether the network management system 140 is online or offline) and the network management system location after migration (ie., on-premises, off-premises). In the examples disclosed herein, the first deployment state may be either offline or online depending on the example but will be on-premises. The second deployment state will be online but may be on-premises or off-premises depending on the example.

In examples in which the second deployment state is off-premises, the network management system 140 and local migration artifacts 150 may be, migrated to a cloud-based network management system 185. The cloud-based network management system 185 is "off-premises" in the sense that it resides on a computing apparatus or a computing system (not otherwise shown) that is off the premises 145 on which the on-premises network management system 140 resides. In the particular examples shown herein, the migration off premises occurs over the public network 180. Similarly, the execution of the technique will result in a set of migrated migration artifacts 190 in these examples. The migrated migration artifacts 190 include, for instance, a migrated device inventory 192, a set of migrated network data 193, and a set of device certificates 194 for the network devices 105 in the migrated device inventory 192.

As a part of the migration process, the local migration artifacts 150 maintained by the on-premises network management system 140 are reconciled with the remote migration artifacts 170 maintained by the cloud-based provisioning service 160. That is, a part of the process is an attempt to conform the content of post-migration artifacts to the content of the remote migration artifacts 170. Note, however, that the technique does not always produce 100% conformity.

Figure 2:
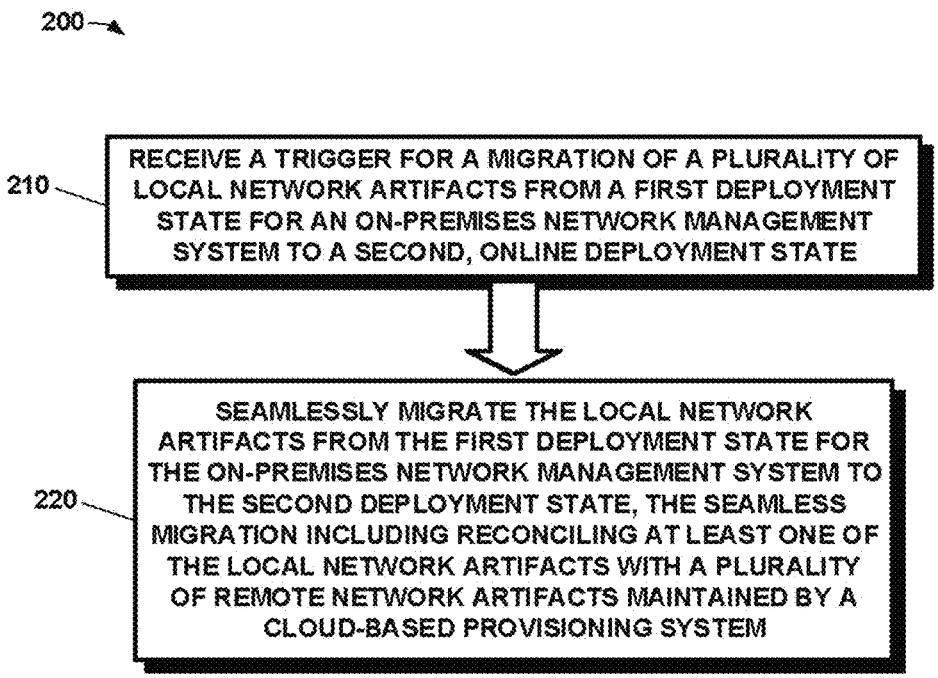
FIG. 2 illustrates a method by which the seamless migration of the network management system, may be performed in some examples.

FIG. 2 illustrates a method 200 by which the seamless migration may be performed in some examples. The method 200 is a method managing a networked computing system. Referring now collectively to FIG. 1 and FIG. 2, the method 200 begins by receiving (at 210) a trigger for a migration of a plurality of local migration artifacts 150 from a first deployment state for an on-premises network management system 140 to a second, online deployment state. The trigger may be, for instance, an input from an administrator though the interface (not separately shown) of the on-premises network management system 140.

Once triggered, the local migration artifacts 150 are seamlessly migrated (at 220) from the first deployment state to a second, online deployment state. This seamless migration (at 220) includes reconciling (at 220) at least one of the local migration artifacts 150 using a cloud-based provisioning system 160. The reconciliation, that is a part of the seamless migration (at 220) will depend, in the illustrated examples, on whether the first deployment state is online or offline and whether the second deployment state is on-premises or off-premises.

Figure 3:
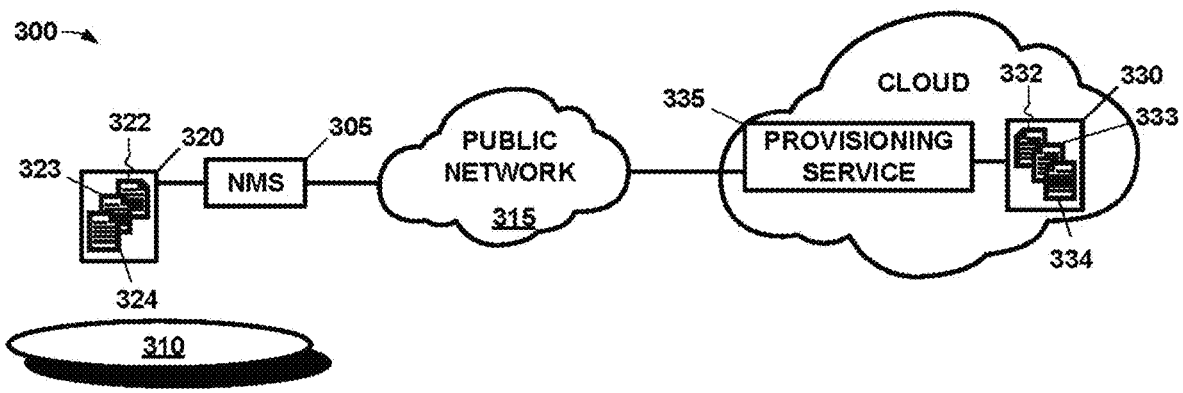
FIG. 3 depicts selected portions of a network management system deployed and migrated in accordance with one or more examples of the subject matter claimed below.

For instance, consider the example of FIG. 3, in which a network management system 305 of a networked computing system 300 is migrating from a first deployment state in which the on-premises network management system 305 is located on the premises 310 and is offline to a second deployment state in which the on-premises network management system 305 is still be on-premises 310 but is online. That is, pre-migration the network management system 305 is not connected to the public network 315 but is post-migration. So, the on-premises network management system 305 is provisioned in the first deployment state in which the on-premises network management system 305 is offline. The network devices 105 are added to the local device inventory 322 by the network management system 305 when they attempt to on-board the networked computing system 300 when first connected.

More particularly, in this example, when the proprietor acquires a new network device 105 and, because the on-premises network management system 305 is offline, the new network device 105 is provisioned using a pre-shared key-based ("PSK-based") process. An administrator adds the Dynamic Host Configuration Protocol ("DH CP") options to specify the network management system Internet Protocol ("IP") address. The administrator enters/ingests device details of all network devices 105, including the new network device 105. This information finds its way as appropriate into the local migration artifacts 320, which include a local device inventory 322 of the network devices 105, local network data 323, and a plurality of local device certificates 324. The network device 105 is connected and sends an on-boarding request to the on-premises network management system 305. The on-premises network management system 305 then on-boards the network device 105 if it has been entered into the local device inventory 322.

Note that the vendor has already generated the remote migration artifacts 330 that are maintained by the cloud-based provisioning service 335. As discussed above, the remote migration artifacts 330 are developed and maintained by the vendor as new network devices 105 are procured and shipped. The remote migration artifacts 330 may include, for instance, a remote device inventory 332 of the network devices 105, remote network data 333, and a plurality of remote device certificates 334. However, because the on-premises network management system 305 is offline, it cannot access the remote migration artifacts 330.

The seamless migration begins when the proprietor chooses to move the on-premises network management system 305 from "offline" to "online" and triggers the seamless migration. This may be done, for instance, through an interface of the on-premises network management system 305. However, the trigger may be executed in other ways in other examples. Once the trigger is communicated to the on-premises network management system 305, the on-premises network management system 305 commences the seamless migration either by executing the seamless migration itself or calling another software component to execute the seamless migration. For instance, in some examples the seamless migration may be performed by service, application, or daemon that is called or invoked by the on-premises network management system 305. In the illustrated examples, the functionality is integrated into the on-premises network management system 305 such that the on-premises network management system 305 executes the seamless migration itself.

The network management system 305 is then reconfigured to permit access to the public network 315 so that it can communicate with the cloud-based provisioning service 335. The on-premises network management system 305 connects to the cloud-based provisioning service 335 and creates provisioning rules based on network management system Internet Protocol/Fully Qualified Domain Name ("IP/FQDN") for the proprietor's account to on board network devices 105 acquired from the vendor.

As mentioned above, the seamless migration includes a reconciliation of the local migration artifacts 320 with the remote migration artifacts 330. In this migration, the local network data 323 and the remote network data 333 do not need reconciliation. In this migration, reconciliation is therefore only performed between the local device inventory 322 and the remote device inventory 332 as well as the local device certificates 324 and the remote device certificates 334.

For device inventory reconciliation, the remote device inventory 332 will serve as the primary source of truth. That is, the remote device inventory 332 will be presumed to be accurate rather than the local device inventory 322 unless established otherwise. The on-premises network management system 305 retrieves the remote device inventory 332 from the cloud-based provisioning service 335 and compares the two inventories. For each network device 105 present in the remote device inventory 332, if the network device 105 is omitted from the local device inventory 322, the on-premises network management system 305 updates the local device inventory 322 to include the network device 105.

If the network device 105 is present in the local device inventory 322 but, not the remote device inventory 332, then on-premises network management system 305 begins a verification process. The on-premises network management system 305 continues to manage the network device 105 for a predetermined grace period (e.g., 15 days) while the verification proceeds. The on-premises network management system 305 then notifies the cloud-based provisioning 335 of the device inventory discrepancy and alerts the proprietor to on-board the network device 105. Upon notification, the cloud-based provisioning service 335 then checks the remote device inventory 332. If the network device 105 is omitted from the remote device inventory 332, the cloud-based provisioning service 335 consults its, service access point ("SAP") to obtain the details of the network device 105. If the omitted network device 105 belongs to the proprietor, then the omitted network device 105 is added to the remote device inventory 332 on, reconciliation with the Enterprise Device inventory and Procurement System ("EIPS"). If the omitted network device 105 does not belong to the proprietor, then the cloud-based provisioning service 335 notifies the on-premises network management system 305 and, after the predetermined grace period is automatically deleted unless the proprietor directly and manually intervenes.

The local device certificates 324 and the remote certificates 334 can then be reconciled once the local device inventory 322 and the remote device inventory 333 are reconciled. Generally, in on-premises, offline deployment, the proprietor uploads a server certificate signed by an issuer for device on-boarding and management. (An issuer can, be a locally managed enterprise issuer, a third-party issuer, or a self-signed certificate, etc.) However, in on-premises, online deployment, there can be also be more than one trusted device certificate 324 which may be combination of a certificate issued by the cloud-based provisioning service 335, a self-signed device certificate, or a third-party-based device certificate, for instance.

A new device certificate 324 may be made available from the cloud-based provisioning service 335. As long as the on-premises network management system 305 is offline, the on-premises network management system 305 continues using the local device certificate 324 and the details it contains. When the network device 105 disconnects from the on-premises network management system 305 while it is offline and before it signs up onto the on-premises network management system 305 that is online, it downloads the new certificate from the cloud-based provisioning service 335. The network device 105 will then connect to the on-premises network management system 305 with the new certificate when the deployment state is changed from on-premises offline to on-premises online.

The deployment state of the on-premises network management system 305 is then changed from on-premises, offline to on-premises, online.

Figure 4:
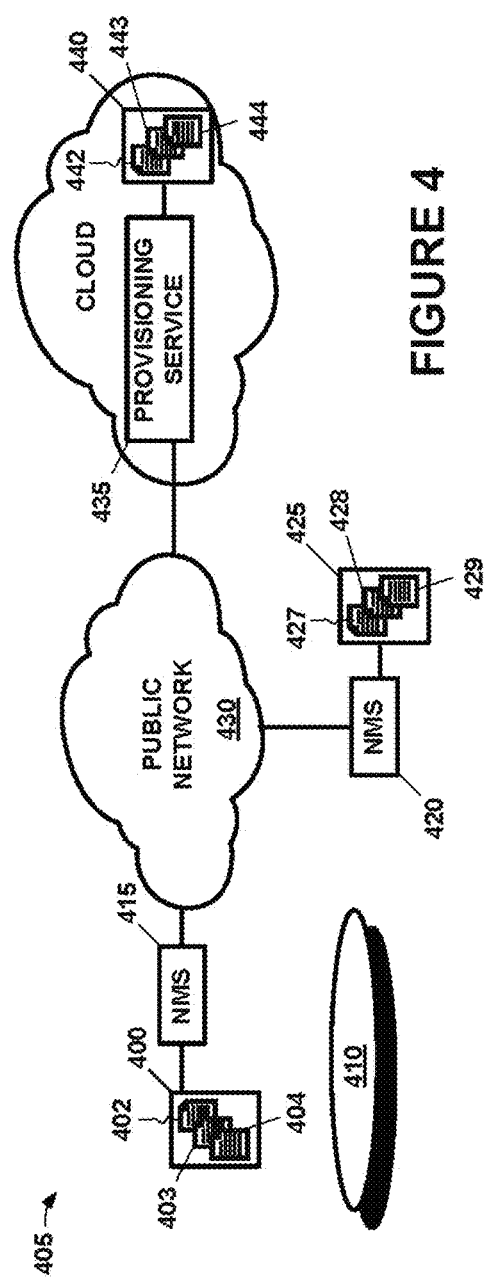
FIG. 4 depicts selected portions of a network management system, deployed and migrated in accordance with one or more examples of the subject matter claimed below.

Turning now to FIG. 4, an example in which a plurality of migration artifacts 400 are seamlessly migrated from an on-premises, offline deployment state to an off-premises, online deployment state is illustrated. The local migration artifacts 400 reside in a networked computing system 405 on a premises 410. The networked computing system 405 also includes an on-premises network management system 415. The migration artifacts 400 are to be seamlessly migrated to a cloud-based network management system 420 residing off the premises 410 on a public network 430, which process will result in the migrated migration artifacts 425. The public network 430 may be, for instance, a public cloud.

More particularly, the local migration artifacts 400 may include, for instance, a local device inventory 402 of the network devices 105, local network data 403, and a plurality of local device certificates 404. As described above, a cloud-based provisioning service 435 maintains a set of remote migration artifacts 440 that may include, for instance, a remote device inventory 442 of the network devices 105, remote network data 443, and a plurality of remote device certificates 444. The seamless migration includes a reconciliation between the local migration artifacts 400 and the remote migration artifacts 440, the local migration artifacts 400 then becoming the migrated migration artifacts 425. The migrated migration artifacts 425 may include, for instance, a migrated device inventory 427 of the network devices 105, migrated network data 428, and a plurality of migrated device certificates 429.

Again, in this example, the proprietor (not shown) of the networked computing system 405 is migrating the on-premises network management system 415 from a first deployment state in which the on-premises network management system 415 is located on the premises 410 and is offline to a second deployment state in which a cloud-based network management system 420 is off the premises 410 and is online. Furthermore, while pre-migration the on-premises network management system 415 is not connected to the public network 430, post-migration the cloud-based network management system 420 will not only be online but will reside on the public network 430. So, the proprietor provisions the on-premises network management system 415 in the first deployment state in which the on-premises network management system 415 is offline. The network devices 105 are added to the local device inventory 402 manually or the on-premises network management system 415 adds the network devices 105 when they attempt to on-board the networked computing system 405 when first connected.

More particularly, in this example, when the proprietor acquires a new network device 105, because the on-premises network management system 415 is offline, the new network device 105 is provisioned using a pre-shared key-based ("PSK-based") process. An administrator adds the Dynamic Host Configuration Protocol ("DHCP") options to specify the network management system Internet Protocol ("IP") address. The administrator enters/ingests device details of all network devices 105, including the new network device 105. This information finds its way as appropriate into the local migration artifacts 400, which include a local device inventory 402 of the network devices 105, local network data 403, and a plurality of local device certificates 404. The network device 105 is connected and sends an on-boarding request to the on-premises network management system 415. The on-premises network management system 415 then on-boards the network device 105 if it has been entered into the local device inventory 402.

Note that the vendor has already generated the remote migration artifacts 440 that are maintained by the cloud-based provisioning service 435. As discussed above, the remote migration artifacts 440 are developed and maintained by the vendor as new network devices 105 are procured and shipped. However, because the on-premises network management system 415 is offline, it cannot access the remote migration artifacts.

The seamless migration begins when the proprietor chooses to move the local migration artifacts 400 from "offline" to "online" and "off-premises" and triggers the seamless migration. This may be done, for instance, through an interface of the on-premises network management system 415. However, the trigger may be executed in other ways in other examples. Once the trigger is communicated to the on-premises network management system 415, the on-premises network management system 415 commences the seamless migration either by executing the seamless migration itself or calling another software component to execute the seamless migration. For instance, in some examples the seamless migration may be performed by service, application, or daemon that is called or invoked by the on-premises network management system 415. In the illustrated examples, the functionality is integrated into the on-premises network management system 415 such that the on-premises network management system 415 executes the seamless migration itself.

The on-premises network management system 415 is then reconfigured to permit access to the public network 430 so that it can communicate with the cloud-based provisioning service 435. The on-premises network management system 415 connects to the cloud-based provisioning service 435 and creates provisioning rules base on network management system IP/FQDN for the proprietor's account to on board network devices 105 acquired from the vendor.

As mentioned above, the seamless migration includes a reconciliation of the local migration artifacts 400 with the remote migration artifacts 440. In this migration, unlike the example of FIG. 3, the local network data 403 and the remote network data 443 are reconciled. In this migration, reconciliation is also performed between the local device inventory 402 and the remote device inventory 442. However, there is no reconciliation between the local device certificates 404 and the remote device certificates 444. The reconciled local migration artifacts 400 then become the migrated migration artifacts 425 that are maintained, by the cloud-based network management system 420.

The cloud-based network management system 420 may obtain a copy (not shown) of the local device inventory 402 from a backup/restore operation performed prior to the reconciliation. If a comparison of the local device inventory 402 and the remote device inventory 442 produces any network devices 105 in the remote device inventory 442 but not in the local device inventory 402, the cloud-based network management system 420 will download those network devices 105 and any associated information from the remote device inventory 442 and into the copy of the local device inventory 402.

If the network device 105 is present in the local device inventory 402 but, not the remote device inventory 427, then cloud-based network management system 420 begins a verification process. The cloud-based network management system 420 continues to manage the network device 105 for a predetermined grace period (e.g., 15 days) while the verification proceeds. The cloud-based network management system 420 then notifies the cloud-based provisioning service 435 of the device inventory discrepancy and alerts the proprietor to on-board the network device 105. Upon notification, the cloud-based provisioning service 435 then checks the remote device inventory 442. If the network device 105 is omitted from the remote device inventory 442, the cloud-based provisioning service 435 consults its EPS to obtain the device detail. If the omitted network device 105 belongs to the proprietor, then the omitted network device is added to the remote device inventory 442 on reconciliation with the EIPS. If the omitted network device 105 does not belong to the proprietor, then the cloud-based provisioning service 435 notifies the cloud-based network management system 420 and, after the predetermined grace period is automatically deleted unless the proprietor directly and manually intervenes. Once the device inventory reconciliation is finished, the reconciled copy of the local device inventory 402 becomes the migrated device inventory 427.

Once the device inventory reconciliation is performed the local network data 403 and the remote network data 443 may be reconciled. Again, the cloud-based network management system 420 may obtain a copy (not shown) of the local network data 403 through a previously performed backup/restore operation. Reconciliation of network data includes, for instance, reconciliation of various applications whose execution is overseen by the on-premises network management system 415. The reconciliation can be handled using existing data backup and migration workflows that have previously been defined in the on-premises network management system 415. Backup and restore may be performed, for instance, with interfacing with the data store engine (not shown) of the network management system 415 at the Data Manipulation Language ("CAL") or Data Definition Language ("DDL") level.

The deployment state is then changed from on-premises, offline to off-premises, online. This will include in this particular example shifting the connection of the network devices 105 of the networked computing system 405 from the on-premises network management system 400 to the cloud-based network management system 420. This will, in turn, include disconnecting the network devices 105 from the network management system 400 and then connecting them with the cloud-based network management system 420.

Figure 5:
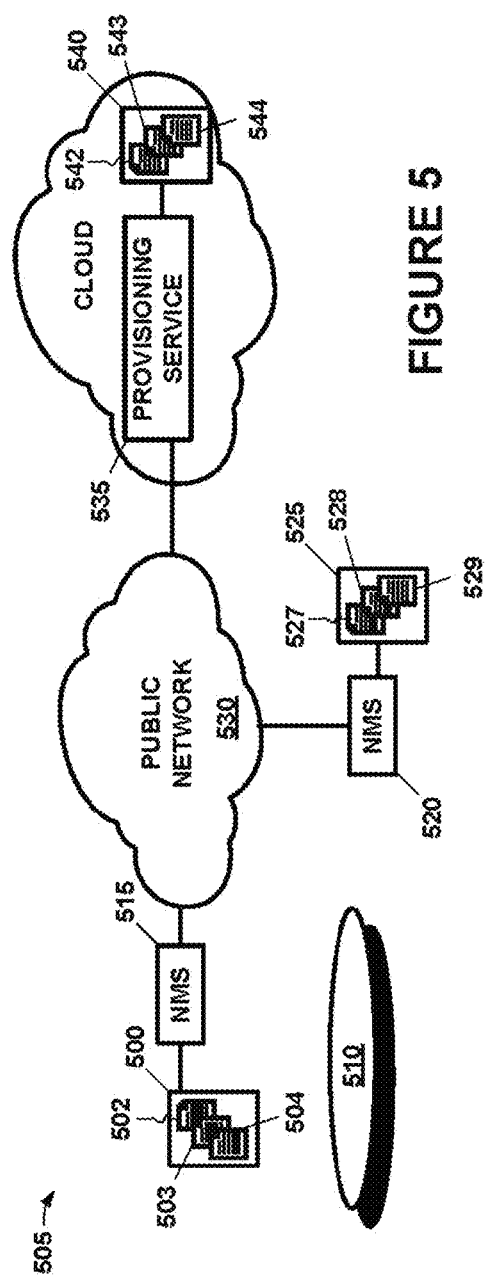
FIG. 5 depicts selected portions of a network management system deployed and migrated in accordance with one or more examples of the subject matter claimed below is shown.

Referring now to FIG. 5, in this example a plurality of migration artifacts 500 are seamlessly migrated from an on-premises, online deployment state to an off-premises, online deployment state. The local migration artifacts 500 reside in a networked computing system 505 on a premises 510. The networked computing system 505 also includes an on-premises network management system 515. The migration artifacts 500 are to be seamlessly migrated to a cloud-based network management system 520 residing off the premises 510 on a public network 530, which process will result in the migrated migration artifacts 525. The public network 530 may be, for instance, a public cloud.

More particularly, the local migration artifacts 500 may include, for instance, a local device inventory 502 of the network devices 105, local network data 503, and a plurality of local device certificates 504. As described above, a cloud-based provisioning service 535 maintains a set of remote migration artifacts 540 that may include, for instance, a remote device inventory 542 of the network devices 105, remote network data 543, and a plurality of remote device certificates 544. The seamless migration includes a reconciliation between the local migration artifacts 500 and the remote migration artifacts 540, the local migration artifacts 500 then becoming the migrated migration artifacts 525. The migrated migration artifacts 525 may include, for instance, a migrated device inventory 527 of the network devices 105, migrated network data 528, and a plurality of migrated device certificates 529.

One difference between the example of FIG. 5 and the examples of FIG. 3 and FIG. 4 is that the on-premises network management system 515 is online. This means that the on-premises network management system 515 has access to the cloud-based provisioning, service 535. Thus, the provisioning of the network devices 105 in the networked computing system 505 need not be performed manually. The on-premises network management system 515 can download all the information needed for provisioning directly from the cloud-based provisioning service. This may include the on-premises network management system 515 accessing the public network 530 so that it can communicate with the cloud-based provisioning service 335. The on-premises network management system 515 connects to the cloud-based provisioning service 535 and creates provisioning rules base on network management system Internet IP/FQDN for the proprietor's account to on board network devices 105 acquired from the vendor.

As mentioned above, the seamless migration includes a reconciliation of the local migration artifacts 500 with the remote migration artifacts 540. In this migration, unlike the examples of FIG. 3 and FIG. 4, the local device inventory 502 need not be reconciled since it is largely drawn from the remote device inventory 542. Similarly, local device certificates 504 are not reconciled with remote device certificates 544 since they are downloaded through the cloud-based provisioning service 535. However, the local network data 503 is reconciled with the remote network data 543. The reconciled local migration artifacts 500 then become the migrated migration artifacts 525 that are maintained by the cloud-based network management system 520.

For data reconciliation, the cloud-based network management system 520 may obtain a copy (not shown) of the local network data 503 through a previously performed backup/restore operation. Reconciliation of network data includes, for instance, reconciliation of various applications whose execution is overseen by the on-premises network management system 515. The reconciliation can be handled using existing data backup and migration workflows that have previously been defined in the on-premises network management system 515. Backup and restore may be performed, for instance, with interfacing with the data store engine (not shown) of the network management system 515 at the DML or DDL level.

The deployment state is then changed from on-premises, online to off-premises, online. This will include shifting the connection of the network devices 105 of the networked computing system 505 from the on-premises network management system 500 to the cloud-based network management system 520. This will, in turn, include disconnecting the network devices 105 from the network management system 500 and then connecting them with the cloud-based network management system 520.

Those in the art having the benefit of the disclosure will appreciate still other examples not illustrated herein. For instance, in the example of FIG. 4 the cloud-based network management system 420 to which the local migration artifacts 400 are seamlessly migrated resides on, a public network 430. However, in some examples, the public network 430 may instead by a private network, such as a private cloud. And, in some of these examples, the private network may reside on the premises 410. So, the migration may be between a first online or offline, on-premises deployment state to a second, online, on-premises or off-premises deployment state.

Figure 6:
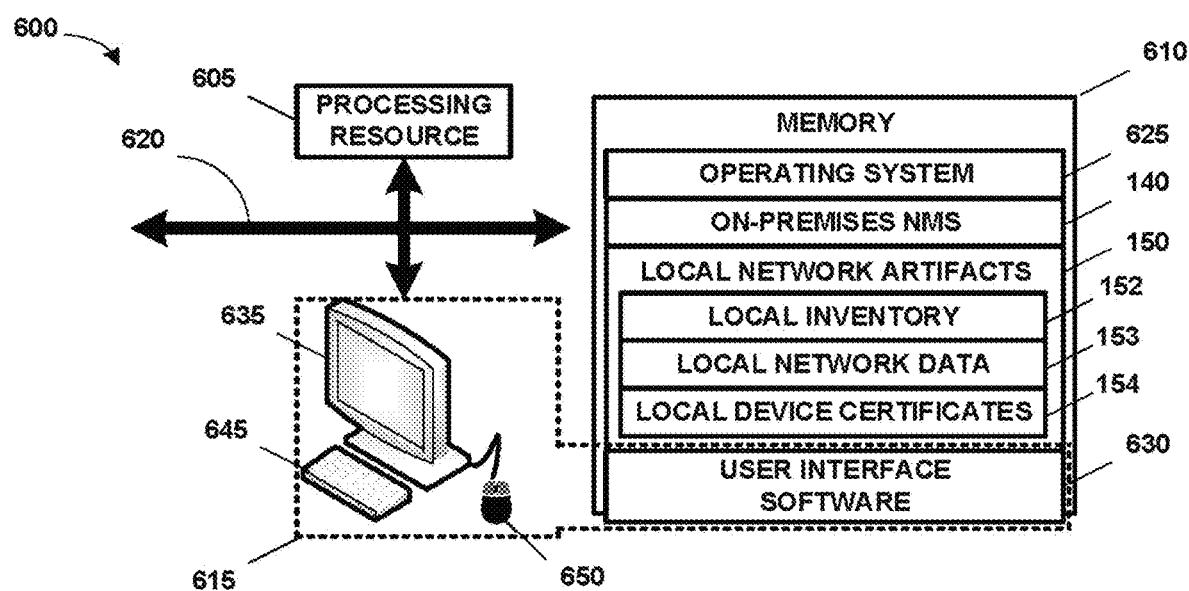
FIG. 6 illustrates selected portions of a hardware and software architecture of an administrative console as may be used in one or more examples.

Returning to FIG. 1, the on-premises network management system 140 and local migration artifacts 150 may be hosted on an administrative console such as the administrative console 600 in FIG. 6. FIG. 6 illustrates selected portions of a hardware and software architecture of an administrative console as may be used in one or more examples. In this particular example, the administrative console 600 hosts the on-premises network management system 140 as well as the local migration artifacts 150, including the local device inventory 152 of the network devices 105, the local network data 153, and the plurality of local device certificates 154. The administrative console 600 also includes a processing resource 605, a memory 610, and a user interface 615, all communicating over a communication system 620. The processing resource 605 and the memory 610 are in electrical communication over the communication system 620 as are the processing resource and the peripheral components of the user interface 615.

The processing resource 605 may be a processor, a processing chipset, or a group of processors depending upon the implementation of the administrative console 600. The memory 610 may include some combination of read-only memory ("ROM") and random-access memory ("RAM") implemented using, for instance, magnetic or optical memory resources such as magnetic disks and optical disks. Portions of the memory 610 may be removable. The communication system 620 may be any suitable implementation known to the art. In this example, the administrative console 600 is a stand-alone computing apparatus. Accordingly, the processing resource 605, the memory 610 and user interface 615 are all local to the administrative console 600 in this example. The communication system 620 is therefore a bus system and may be implemented using any suitable bus protocol.

The memory 610 is encoded with an operating system 625 and user interface software 630. The user interface software ("UIS") 630, in conjunction with a display 635, implements the user interface 615. The user interface 615 includes a dashboard (not separately shown) displayed on a display 635. The user interface 615 may also include other peripheral I/O devices such as a keypad or keyboard 645 and a mouse 650. In, some examples, the screen of the display 635 may be a touchscreen so that the peripheral I/O devices may be omitted.

Note that in FIG. 6 the user interface software 630 is shown separately from the network management system 140. As mentioned above, in some embodiments the user interface software 630 may be integrated into and be a part of the network management system 140. Similarly, the local migration artifacts 150 are shown separately from the network management system 140 but may, in some examples, be considered a constituent part of the network management system 140. Still further, as discussed above, the network management system 140 may comprise a suite of applications or other software components. These software components need not all be located on the same computing apparatus and may, in some examples, be distributed across the networked computing system 100. Similarly, the local migration artifacts 150 may also by distributed across the networked computing system 100 rather than stored collectively on a single computing apparatus. Furthermore, in some examples, the seamless migration functionality may be implemented by a separate software component invoked or called by the network management system 140, or invoked or called by an administrator through the network management system 140.

The processing resource 605 runs under the control of the operating system 625, which may be practically any operating system. The network management system 140 is invoked by a user through the dashboard, the operating system 625 upon power up, reset, or both, or through some other mechanism depending on the implementation of the operating system 625. The network management system 140, when invoked, performs the method 200 illustrated in FIG. 2 and discussed above.

The presently disclosed seamless migration technique provides many practical applications and improvements for the networked computing systems on which it is employed. For example, they provide a faster upgrade cycles and patch deliveries in examples in which the local artifacts are migrated off-premises to a cloud. This is because they are owned and managed by Development and Operations ("DevOps") team manages the public cloud round-the-clock. The persistent presence and service of the DevOps team ensures better overall network health monitoring, quicker issue detection and resolution.

The seamless migration technique also improves network readiness because of the increased ability to obtain certificates and device-device inventory lists from cloud-based provisioning services. This feature also eases device onboarding and reduces error introduced by manual provisioning. The technique also improves beta feature availability to providers interested in testing new and upcoming features. Still other practical applications and improvements in operation will become apparent to those skilled in the art having the benefit of this disclosure.

The figures set forth herein aid in depicting various architectures, functionalities, and operations of the examples disclosed herein. Throughout the description, many of the elements are defined, at least in part, as programs, programming, or program instructions. Each of these elements, portions thereof, or various combinations thereof may represent in whole or in part a module, segment, or portion of code that includes one or more executable instructions to implement any specified logical function(s). Each element or various combinations thereof may represent a circuit or a number of interconnected circuits to implement the specified logical function(s).

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require, physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is, a "physical transformation" in that it changes the physical state of the storage for the computing apparatus.

The examples disclosed herein may be realized in any non-transitory, tangible computer-readable media for use by or in connection with an instruction execution system, such as, a computer/processor-based system, or an Application Specific Integrated Circuit ("ASIC"), or another system that can fetch or obtain the logic from computer-readable media and execute the instructions contained therein. Non-transitory, tangible computer-readable media may be any media that is capable of containing, storing, or maintaining programs and data for use by or in connection with the computing systems disclosed herein. Computer readable media may include any one of many physical media such as, for example, electronic, magnetic, optical, electromagnetic, or semiconductor media.

More specific examples of suitable computer-readable media include a portable magnetic computer diskette such as floppy diskettes or hard drives, a random-access memory ("RAM"), a read-only memory ("ROM"), an erasable programmable read-only memory ("EPROM"), or a portable compact disk ("CD"), digital video disk ("DVD"), or flash drive. Similarly, the transmission medium may be twisted wire pairs, coaxial cable, optical fiber, or some other suitable transmission medium known to the art. The technique is not limited by these aspects of any given implementation.

This concludes the detailed description. The particular examples disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular examples disclosed above may be altered or modified and all such variations are considered within the scope and spirit of the appended claims. Accordingly, the protection sought herein is as set forth in the claims below.

What is claimed is:

1. A method for use in managing a networked computing system, comprising:

receiving a trigger for a migration of a plurality of local migration artifacts from a first deployment state associated with an on-premises network management system to a second deployment state associated with a cloud-based provisioning system;

migrating the plurality of local migration artifacts from the first deployment state associated with the on-premises network management system to the second deployment state associated with the cloud-based provisioning system, the migration being seamless and including reconciling at least one local migration artifact of the plurality of local migration artifacts with a plurality of remote migration artifacts maintained by the cloud-based provisioning system, wherein the at least one local migration artifact includes local device inventory of a plurality of network devices managed by the on-premises network management system, and at least one of: certificates that the on-premises network management system is to provide to the network devices, monitoring statistics about the network devices managed by the network management system, alerts that have been issued by the network management system, or syslog messages that have been issued by the network management system; and managing the networked computing system based on the local device inventory for a predetermined period of time in response to a discrepancy between the local device inventory and a remote device inventory associated with the cloud-based provisioning system.

2. The method of claim 1, wherein the second deployment state is online and off-premises.

3. The method of claim 2, wherein seamlessly migrating the plurality of local migration artifacts from the first deployment state associated with the on-premises network management system to the second deployment state includes:

seamlessly migrating the plurality of local migration artifacts from the on-premises network management system to a cloud-based network management system; and shifting a connection of a plurality of network devices with which the plurality of local migration artifacts are associated from the on-premises network management system to the cloud-based network management system.

4. The method of claim 1, wherein:

the first deployment state is offline and on-premises and the second deployment state is online and on-premises;

the plurality of local migration artifacts include a local device inventory and a plurality of local device certificates;

the plurality of remote migration artifacts include a remote device inventory and a plurality of remote device certificates; and reconciling the at least one local migration artifact of the plurality of local migration artifacts with the plurality of remote migration artifacts includes:

reconciling the local device inventory of the on-premises network management system and the remote device inventory of the cloud-based provisioning service; and reconciling the local device certificates and the remote device certificates.

5. The method of claim 1, wherein:
the first deployment states is offline and on premises and the second deployment state is online and off-premises;
the plurality of local migration artifacts include a local device inventory and a plurality of local network data;
the plurality of remote migration artifacts include a remote device inventory and a plurality of remote network data; and
reconciling the at least one local migration artifact of the plurality of local migration artifacts with the plurality of remote migration artifacts includes:
reconciling the local device inventory and the remote device inventory; and
reconciling network data between the on-premises network management system and the cloud-based provisioning service upon reconciliation of the local device inventory and the remote device inventory.

6. The method of claim 1, wherein:
the first deployment state is online and on-premises and the second deployment state is online and off-premises;
the plurality of local migration artifacts include a plurality of local network data;
the plurality of remote migration artifacts include a plurality of remote network data; and
reconciling the at least one local migration artifact of the plurality of local migration artifacts with the plurality of remote migration artifacts includes reconciling the local network data and the remote network data.

7. A networked computing system, comprising:
a plurality of network devices;
an on-premises network management system that, in operation, manages the plurality of network devices and includes software component that, upon receiving a trigger:
seamlessly migrates a plurality of local migration artifacts from a first deployment state associated with the on-premises network management system to a second deployment state associated with a cloud-based provisioning system, the seamless migration including reconciling at least one local migration artifact of the plurality of local migration artifacts with a remote migration artifact of a plurality of remote migration artifacts maintained by the cloud-based provisioning system, wherein the at least one local migration artifact includes a local device inventory of the network devices managed by the on-premises network management system, and at least one of: certificates that the on-premises network management system is to provide to the network devices, monitoring statistics about the network devices managed by the network management system, alerts that have been issued by the network management system, or syslog messages that have been issued by the network management system; and
manages the networked computing system based on the local device inventory for a predetermined period of time in response to a discrepancy between the local device inventory and a remote device inventory associated with the cloud-based provisioning system.

8. The networked computing system of claim 7, wherein the software component is integrated into the on-premises network management system.

9. The networked computing system of claim 7, wherein the software component is an application, a service, or a daemon.

10. The networked computing system of claim 7, wherein the second deployment state is online and off-premises.

11. The networked computing system of claim 10, wherein the seamless migration includes:
seamlessly migrating the plurality of local migration artifacts from the on-premises network management system to a cloud-based network management system; and
shifting the connection of the plurality of network devices with which the plurality of local migration artifacts are associated from the on-premises network management system to the cloud-based network management system.

12. The networked computing system of claim 7, wherein:
the first deployment state is offline and on-premises and the second deployment state is online and on-premises;
the plurality of local migration artifacts include a local device inventory and a plurality of local device certificates;
the plurality of remote migration artifacts include a remote device inventory and a plurality of remote device certificates; and
reconciling the at least one local migration artifact of the plurality of local migration artifacts with the plurality of remote migration artifacts includes:
reconciling the local device inventory of the on-premises network management system and the remote device inventory of the cloud-based provisioning service; and
reconciling the local device certificates and the remote device certificates.

13. The networked computing system of claim 7, wherein:
the first deployment states is offline and on premises and the second deployment state is online and off-premises;
the plurality of local migration artifacts include a local device inventory and a plurality of local network data;
the plurality of remote migration artifacts include a remote device inventory and a plurality of remote network data; and
reconciling the at least one local migration artifact of the plurality of local migration artifacts with the plurality of remote migration artifacts includes:
reconciling the local device inventory and the remote device inventory; and
reconciling network data between the on-premises network management system and the cloud-based provisioning service upon reconciliation of the local device inventory and the remote device inventory.

14. The networked computing system of claim 7, wherein:
the first deployment state is online and on-premises and the second deployment state is online and off-premises;
the plurality of local migration artifacts include a plurality of local network data;
the plurality of remote migration artifacts include a plurality of remote network data; and
reconciling the at least one local migration artifact of the plurality of local migration artifacts with the plurality of remote migration artifacts includes reconciling the local network data and the remote network data.

15. A computing apparatus, comprising:
a processing resource;
a bus system; and
a memory that, in operation, communicates with the processing resource over the bus system and is encoded with instructions that, when executed by the processing resource over the bus system, cause the processing resource to:
receive a trigger for a migration of a plurality of local migration artifacts from a first deployment state for an on-premises network management system to a second deployment state associated with a cloud-based provisioning system;
seamlessly migrate the local migration artifacts from the first deployment state associated with the on-premises network management system to the second deployment state associated with the cloud-based provisioning system, the seamless migration including reconciling at least one local migration artifact of the plurality of local migration artifacts with a plurality of remote migration artifacts maintained by the cloud-based provisioning system, wherein the at least one local migration artifact includes a local device inventory of the network devices managed by the on-premises network management system, and at least one of: certificates that the on-premises network management system is to provide to the network devices, monitoring statistics about the network devices managed by the network management system, alerts that have been issued by the network management system, or syslog messages that have been issued by the network management system; and
manage the networked computing system based on the local device inventory for a predetermined period of time in response to a discrepancy between the local device inventory and a remote device inventory associated with the cloud-based provisioning system.

16. The networked computing system of claim 15, wherein:
the first deployment state is offline and on-premises and the second deployment state is online and on-premises;
the plurality of local migration artifacts include a local device inventory and a plurality of local device certificates;
the plurality of remote migration artifacts include a remote device inventory and a plurality of remote device certificates; and
reconciling the at least one local migration artifact of the plurality of local migration artifacts with the plurality of remote migration artifacts includes:
reconciling the local device inventory of the on-premises network management system and the remote device inventory of the cloud-based provisioning service; and
reconciling the local device certificates and the remote device certificates.

17. The computing apparatus of claim 15, wherein:
the first deployment states is offline and on premises and the second deployment state is online and off-premises;
the plurality of local migration artifacts include a local device inventory and a plurality of local network data;
the plurality of remote migration artifacts include a remote device inventory and a plurality of remote network data; and
reconciling the at least one local migration artifact of the plurality of local migration artifacts with the plurality of remote migration artifacts includes:
reconciling the local device inventory and the remote device inventory; and
reconciling network data between the on-premises network management system and the cloud-based provisioning service upon reconciliation of the local device inventory and the remote device inventory.

18. The computing apparatus of claim 15, wherein:
the first deployment state is online and on-premises and the second deployment state is online and off-premises;
the local migration artifacts include a plurality of local network data;
the remote migration artifacts include a plurality of remote network data; and
reconciling the at least one local migration artifact of the plurality of local migration artifacts with the plurality of remote migration artifacts includes reconciling the local network data and the remote network data.

19. The method of claim 1, wherein the discrepancy between the local device inventory and the remote device inventory includes a network device present in the local device inventory and not present in the remote device inventory, and wherein the network device is deleted from the remote device inventory after the predetermined period of time.

20. The method of claim 1, wherein the discrepancy between the local device inventory and the remote device inventory includes a network device present in the remote device inventory and not present in the local device inventory, and wherein the local device inventory is automatically updated to include the network device.

* * * * *